United States Patent [19]

Neefe

[11] Patent Number: 4,666,640
[45] Date of Patent: May 19, 1987

[54] METHOD OF MAKING A SPIN CAST GRADIENT LIGHT ABSORBING CONTACT LENS

[76] Inventor: Charles W. Neefe, 811 Scurry St., P.O. Box 429, Big Spring, Tex. 79720

[21] Appl. No.: 828,995

[22] Filed: Feb. 13, 1986

[51] Int. Cl.⁴ .............................................. B29D 11/00
[52] U.S. Cl. ...................................... 264/2.1; 264/1.9; 351/162
[58] Field of Search ................... 264/1.1, 1.7, 1.9, 2.1, 264/2.7, 311; 425/808; 351/162, 163, 165

[56] References Cited

U.S. PATENT DOCUMENTS

| | | | |
|---|---|---|---|
| 3,870,775 | 3/1975 | Castro et al. | 264/311 |
| 4,022,855 | 5/1977 | Hamblen | 264/2.1 |
| 4,558,931 | 12/1985 | Fuhrman | 264/1.7 |
| 4,576,453 | 3/1986 | Borowsky | 351/162 |

FOREIGN PATENT DOCUMENTS

| | | | |
|---|---|---|---|
| 1004424 | 9/1965 | United Kingdom | 264/2.1 |
| 1163617 | 9/1969 | United Kingdom | 264/2.1 |

Primary Examiner—James Lowe

[57] ABSTRACT

A method of spin casting gradient light absorbing contact lenses. A concave spin casting mold is provided. A mixture of liquid lens monomer and a light absorbing material is placed in the concave spin casting mold. The concave mold is allowed to remain quiescent until the heavier light absorbing material settles at the center of the concave mold surface. The spin casting mold is rotated at the speed required to form a contact lens. The liquid lens monomer spreads outward leaving a dense zone of light absorbing material at the lens center and progressively less light absorbing material toward the lens edge. The rotating liquid lens monomer is allowed to polymerize. The gradient absorption lens having a clear periphery is removed from the mold.

12 Claims, 3 Drawing Figures

METHOD OF MAKING A SPIN CAST GRADIENT LIGHT ABSORBING CONTACT LENS

PRIOR ART

U.S. Pat No. 3,034,403 describes a hard contact lens having a dark central disk. The central dark area has a sharp demarcation line at its periphery. In order to function the lens must remain exactly center on the visual axis. This degree of centration is difficult to achieve and maintain.

STATE OF THE ART

Sunglasses, lenses which absorb part of the visible spectrum, are widely used as protection from the bright and harmful radiations from the sun. It is also understood that these dark tinted lenses are a disadvantage in dimly lighted areas and at night.

This invention provides a lens which for all practical purposes will be of dark tint when worn in the bright sunlight and of light overall effective tint when worn indoors under low level of illumination and at night. This apparent change in absorption will take place automatically and to the correct degree with no special or voluntary action on the part of the wearer. This lens is a sunglass lens when in bright sunlight and a lens of very light tint when in the dark.

The natural action of the iris controls the degree of tint or absorption of this lens. The central dark tinted area which is as large as the pupil when it is contracted to its smallest size in bright sunlight acts as the darkest sunglass tint. As the pupil enlarges due to less light entering the eye the outer less tinted parts of the lens are used, reducing the average or overall degree of tint. In a dark room such as a motion picture theater or at night time the pupil dilates to its largest natural size and the average or overall tint of the lens is very low due to the fact that if the pupil dilates to three and one half (3.5) times it smallest diameter, from two millimeters to seven millimeters, the area increases to twelve and one fourth (12.25) times and overall tint is reduced by a factor of 12.25 to one. It is understood that all persons may not have a normal iris reflex. This will not prevent these persons from receiving excellent results since a much smaller factor is acceptable.

One of the most important properties of the retinal receptors in the reduction of image defects is the phenomenon shown by Stiles-Crawford. The Stiles-Crawford effect says that the cones have an appreciably greater sensitivity to axially incident light than to obliquely incident light from the peripheral zones of the lens.

This effect is caused by internal reflections occurring within the cones which tend to act as wave guides. As can be seen, the Stiles-Crawford phenomenon restricts the visual response angle of the cones. The area of the lens providing the required visual response angle is reduced.

The function of the rods is not affected by the Stiles-Crawford phenomenon. The rods are present throughout the entire area of the retina and are responsible for black on white vision. The cones are densely packed in the central macular area and are responsible for color vision.

SUBJECT OF THE INVENTION

Developments in the art of spin casting has made a gradient central tint contact lens possible. A spin cast gradient tint contact lens which has an effective dark tint in bright light and a lighter effective tint in dim light when the pupil dilates can now be made.

IN THE DRAWING

DESCRIPTION OF THE INVENTION

The "Contact Lens of Apparent Variable Light Absorption" as disclosed in U.S. Pat. No. 3,034,403 filed Apr. 03, 1959 provides a workable variable contact lens sunglass. The problems encountered are (1) the lens must center exactly and (2) the lens must not move vertically during the blink. Lack of centration such as a high riding lens (this is common in hard lens myopic corrections) moves the dark area of the image off-center on the retina. Lens vertical movement with each blink produces a change in the location of the dark area on the retina.

Figure 3:
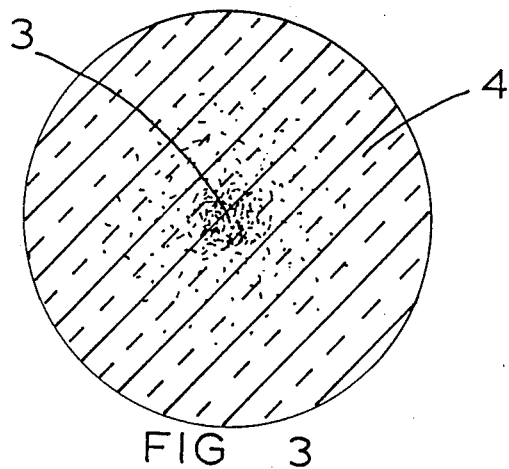
FIG. 3 shows the finished lens with a gradient light absorption.

Fluctuation in overall light absorption occurs in bright sunlight with lens movement. These adverse effects are due to the small size of the dark central area and the sharp demarcation line at the periphery of the central dark area. Large lenses which are fit with steep concave curvature and tight against the cornea do not move. Large tight lenses cannot be tolerated for long periods of time due to hypoxia and resulting corneal insult and degradation. A solution to these problems has been found. A gradient high absorption lens, darkest at the center and progressively lighter toward the lens edge provides relief from the problems encountered with variable light absorption lenses. The darker central area 3 FIG. 3 is positioned over the pupil of the eye. The non-light absorption peripheral area 4 FIG. 3 covers most of the corneal area. Changes in pupil size will result in a change in light absorption. The smaller pupil size will result in a greater light absorption due to the darker dense central area occupying the pupil area. Lens movement will not result in extreme light fluctuations due to the gradient surrounding the dense central area. Centration requirements are also less severe again due to the density gradient surrounding the central dark area. Vertical movement may also be accepted without the dramatic changes in apparent brightness previously experienced. A dense central area of one to three millimeters in diameter is provided having a light transmission of from 10% to 40% and progressing higher light transmission outward to a 6 millimeter to 8 millimeter diameter. The remainder of the lens has no light absorption material.

Gas permeable hard lens materials are supplied in blank form having the gradient absorption running through the blank from which the lens is made. Soft lenses are desirable for the gradient absorption lenses. Soft lenses may be fit larger than the cornea and vertical movement restricted to one millimeter or less. Soft lenses are made from a xerogel blank having the gradient pattern passing through the blank or by spin casting the gradient zone in the lens.

SPIN CAST GRADIENT ABSORPTION LENSES ARE MADE AS FOLLOWS

Figure 1:
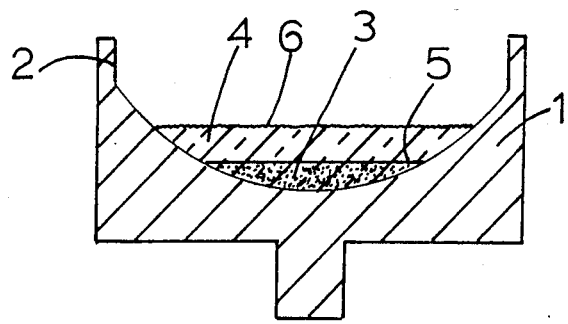
FIG. 1 shows the spin cast mold quiescent with the liquid monomer and colorant, in section.
Figure 2:
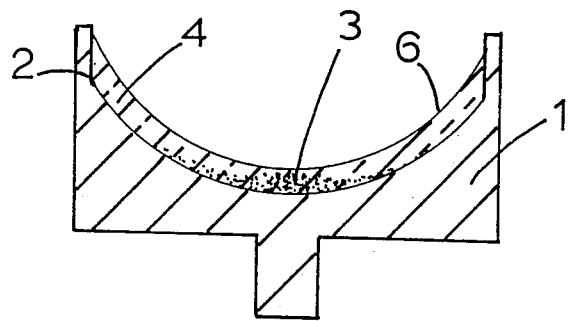
FIG. 2 shows the spin cast mold with the lens formed by rotation, in section.

A concave spin cast mold 1 FIGS. 1 and 2 is provided. The concave spin cast mold is made from metal, glass or plastic and has a concave optical surface 5 FIG. 1. The concave optical surface has the radius required in the convex lens surface. A retaining ring 2 FIGS. 1 and 2 is provided to contain the liquid lens monomer when rotation begins. The retaining ring 2 FIG. 1 will determine the diameter of the lens produced. A liquid lens monomer 4 FIG. 1 and a light absorption material having a specific gravity heavier than the liquid lens monomer are placed in the concave lens mold. The heavier light absorbing material is allowed to settle to the bottom 3 FIG. 1. Finely divided metal powders such as silver, platinum, titanium, tungsten, osmium, palladium and iridium provide the light absorption. Non-metals such as carbon black and many pigments may be used.

The mold containing the monomer and light absorber colorant are allowed to remain quiescent until the heavier colorant has settled to form a layer 3 FIG. 1 at the center of the concave mold 1 FIG. 1. The mold is rotated at the speed required to form a lens having the desired concave curvature 6 FIG. 2. The colored light absorbing material 3 FIG. 2 will spread outward from the center leaving a dense light absorbing zone at the center 3 FIG. 2.

The following are examples of useful monomer mixtures:

(1) A polymerization mixture of 15 parts methacrylamide, 80 parts ethylene glycol monomethacrylate containing 0.4 ethylene glycol bis-methacrylate and 5 parts dibenzoyl peroxide.

(2) A liquid mixture of 95 parts ethylene glycol monomethacrylate, 4.5 parts ethylene glycol, 0.5 part ethylene glycol dimethacrylate and 0.01 part dibenzoyl peroxide was completely purged of atmospheric oxygen.

(3) Hydroxyethyl methacrylate (HEMA) 70 g., N-vinylpyrrolidone (NVP) 30 g., ethyleneglycol dimethacrylate (EGDMA) 1.5 g., triallyl isocyanurate (TAIC) 0.5 g., and ammonium persulfate 2 g.

(4) Ethylene glycol monomethacrylate 64.8%, diethylene glycol monomethacrylate 7.056%, Ethylene glycol dimethacrylate 0.144%, water 20.9%, ammonium persulfate 1.1% and 2-dimethylaminoethyl acetate 6.0%.

(5) Ethylene glycol monomethacrylate 54.7%, diethylene glycol monomethacrylate 17.2%, Diethylene glycol dimethacrylate 0.6%, ammonium persulfate 1.1%, dimethylaminoethyl acetate 5.8%.

A formula may be developed by considering the forces acting on the liquid. A body of liquid lying at rest will form a surface normal to the force of gravity acting upon it. In the same manner, if a liquid is held in a container which is rotated about a vertical axis, a surface will be formed which is everywhere normal to the resultant force acting on each surface element.

It can be shown mathematically that when a liquid is revolved in a horizontal plane, the free surface takes the form of a paraboloid, a parabola of revolution. ("Fluid Mechanics," R. C. Binder, 3rd Edition, 1955, Prentice-Hall, New York). Moreover, it can further be shown that, since the equation of the parabola is:

$$y^2 = 4fx$$

the focal length f of the paraboloid so formed is a function of the speed of rotation. This can be expressed more simply by the following formula:

$$F \text{ in meters} = 4,447/(RPM)^2$$

Since no centrifugal force exists at the exact center of rotation, the colorant is spread to form a gradient central area and equilibrium is quickly reached.

The rotating liquid lens monomer with a gradient light absorption central area is allowed to polymerize forming a lens having a dark central area surrounded by a gradient area with progressively less absorption toward the edge and a clear periphery.

It is understood that the invention is not limited to the exact details of construction shown and described herein for obvious modifications will occur to persons skilled in the art.

I claim:

1. A method of spin casting gradient light absorbing contact lenses having the greatest amount of light absorbing material in the central area by the steps of providing a concave spin casting mold, placing a liquid lens monomer and a light absorbing finely divided material having a specific gravity greater than the liquid lens monomer in the concave spin casting mold, allowing the concave mold liquid monomer and light absorbing material to remain quiescent until the heavier light absorbing material settles against the center of the concave mold surface, rotating the spin casting mold at the speed required to form a contact lens having the desired concave curvature, allowing the liquid lens monomer and the colored light absorbing material to spread outward from the center leaving a dense light absorbing zone at the lens center and progressively less absorption toward the lens edge, allowing the rotating liquid lens monomer to polymerize, removing the gradient absorption lens from the mold.

2. The subject matter set forth in claim 1 wherein the gradient light absorption material is a finely divided metal powder.

3. The subject matter set forth in claim 1 wherein the light absorption material is carbon black.

4. The subject matter set forth in claim 1 wherein the light absorption material is a pigment.

5. The subject matter set forth in claim 1 wherein the light absorption material has specific gravity greater than the lens material.

6. The subject matter set forth in claim 1 wherein the peripheral area of the lens is clear.

7. A method of spin casting gradient light absorbing contact lenses by the steps of providing a concave spin casting mold, placing a mixture of liquid lens monomer and a light absorbing material in the concave spin casting mold, allowing the concave mold to remain quiescent until the heavier light absorbing material settles at the center of the concave mold surface, rotating the spin casting mold at the speed required to form a contact lens, allowing the liquid lens monomer to spread outward leaving a dense zone of light absorbing material at the lens center and progressively less light absorbing material toward the lens edge, allowing the rotating liquid lens monomer to polymerize, removing the gradient absorption lens from the mold.

8. The subject matter set forth in claim 7 wherein the gradient light absorption material is a finely divided metal powder.

9. The subject matter set forth in claim 7 wherein the light absorption material is carbon black.

10. The subject matter set forth in claim 7 wherein the light absorption material is a pigment.

11. The subject matter set forth in claim 7 wherein the light absorption material has specific gravity greater than the lens material.

12. The subject matter set forth in claim 7 wherein the peripheral area of the lens is clear.

* * * * *